May 31, 1927.
F. EVANS
1,630,261
TALKING TOY MECHANISM
Filed March 22, 1923
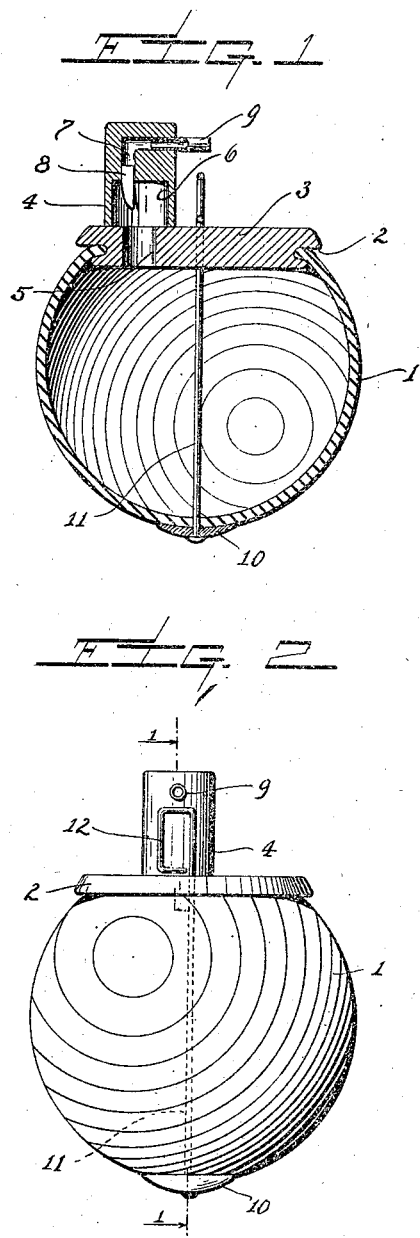
INVENTOR.
FRED EVANS.
BY
ATTORNEY.

Patented May 31, 1927.

1,630,261

UNITED STATES PATENT OFFICE.

FRED EVANS, OF SUMMIT, NEW JERSEY, ASSIGNOR, BY MESNE ASSIGNMENTS, TO VOICES INCORPORATED, A CORPORATION OF DELAWARE.

TALKING TOY MECHANISM.

Application filed March 22, 1923. Serial No. 626,782.

This invention has to do with sound producing mechanisms, and relates specifically to a mechanism which is operable to simulate the cry of a child, the device being provided with means by which distinct syllables will be enunciated.

One of the objects of this invention is to provide a simple, easily operable sound producing mechanism of the type described, which shall be cheaply manufactured, and which shall closely simulate the desired sound.

Another object of the invention is to provide a sound producing device of the class described, which shall be provided with means by which distinct syllables may be enunciated, together with means by which the sound emitted may be controlled.

Another object of the invention is to provide a sound producing device of the type described, which shall be simple and compact, easily concealed within the body of the toy, or in the hand, and which shall be operable to simulate the cry of an infant, while at the same time being provided with means by which the character of the sound emitted may be varied.

Other objects and aims of the invention, more or less specific than those referred to above, will be in part obvious and in part pointed out in the course of the following description of the elements, combinations, arrangements of parts and applications of principles constituting the invention; and the scope of protection contemplated will be indicated in the appended claims.

In the accompanying drawing, wherein I have shown a preferred form of embodiment of my invention:

Figure 1 is a vertical cross-sectional view of the device on the line 1—1 of Figure 2; and Figure 2 is a view of the device in said elevation.

Referring now to the drawing, wherein similar reference characters refer to similar parts throughout both views thereof, the reference character 1 designates a collapsible member, preferably made as is here shown in the form of a bulb, and constructed of a resilient material, such as rubber. This bulb has an aperture formed therein, the edges of which are engaged in a channel 2, cut in the periphery of a disc 3.

Positioned on the disc 3 is a tubular member 4, which overlies an aperture 5, through the disc 3. The member 4 is formed with a relatively large chamber 6, directly overlying the aperture 5, a passageway 7 extending upwardly from the chamber 6 in the member 4, and passing outwardly at right angles, the chamber 6 thus being open to the atmosphere.

Positioned within the passageway 7, and having its end projecting into the chamber 6, is a reed 8, which will be selected so as to give a high pitched cry, and mounted in the passageway 7, at its opening into the atmosphere, is a tube 9, this tube being made of a resilient material, such as a piece of a small rubber tube. It will be noted that the tube 9 extends some distance beyond the walls of the member 4.

Attached by means of a washer 10, and a suitable connection to the wall of the member 1, at a point opposite the disc 3, is a rod 11, this rod extending through a suitable aperture formed centrally of the disc 3, and being bent upon itself to form a square sided loop 12 having upper and lower crossbars designated respectively by numbers 13 and 14, as is shown in Figure 2. This loop 12 is so positioned that if the member 1 is collapsed, the loop will be forced to a position where it will pass by the tube 9, the cross-bars of the loop successively striking the tube 9 and bending it out of the way, so that the loop may pass by.

It will be understood that a device of this character is to be used ordinarily within the body of a talking toy or doll, or it may be used as a toy in itself, being held in the hand and manipulated to produce the cry. If concealed within the body of the doll, it will be so positioned that the bulb 1 will be collapsed by a pressure which will force the walls inwardly, and at the same time force the squared loop past the tube 9. The action of the device is as follows:

With the various parts in the position which they will naturally assume, that is to say, as shown in Figure 1, pressure is exerted against the bulb 1, so as to collapse it and expel air therefrom through the aperture 5. This expelled air will pass through the reed 8 and out into the atmosphere through the tube 9, this causing the reed to vibrate and emit a sound. However, as the sound is being given out, at the same time the square loop 12 is being forced toward the tube 9, and the upper cross-bar will strike the tube 9, and bend it out of the way of the travel of the cross-bar. As the tube 9 is bent, it will be understood that it will actually flatten, and as it flattens it will cut down the amount of air being expelled through the passageway 7. This will accordingly result in a diminution of the sound with the production of a distinct syllable. The upper cross-bar will continue to press the tube 9 out of its path of travel, until finally the tube will slide over the cross-bar and project through the interior of the loop, whereupon the passageway 7 will again be open to the air. Continued pressure on the wall of the bulb 1 will eventually force the second cross-bar past the tube 9, whereupon another syllable will be enunciated.

It will be seen that the operation of the cross-bar on the tube will give an action which will closely simulate that of the human lips in the production of distinct syllables, and by selecting the reed so that it will be similar to that of the cry of an infant, the "ma-ma" sound can be produced which is almost indistinguishable from the cry of a child.

When pressure on the wall of the bulb 1 is released, the resilience of this wall will cause it again to assume the distended position shown in Figure 1. Air will be taken into the interior of the bulb, the tube 9, the passageway 7, the reed 8, and the passageway 5, this return of air, however, causing no sound, owing to the manner in which the reed is disposed. A downward movement of the loop 12 will, therefore, simply bend the tube 9 out of the way without causing the production of any syllables.

When the wall of the bulb is in the distended position shown in Figure 1, further sounds may be produced as desired. While the loop 12 is here shown to produce two distinct syllables, it is clear that various other forms of loop may be provided to shut off the tube 9, and thereby produce various combinations of syllables.

It will be seen that I have devised a sound producing mechanism, well adapted to attain the various objects and purposes set forth. The device may be very cheaply made, the disc 3, and the member 4 being constructed of wood, while the bulb 1 may be made of a cheap rubber. The device has few working parts, none of which will be readily worn out, and produces a sound which is thoroughly satisfactory for the purposes desired.

As many changes could be made in this construction without departing from the scope of the following claims, it is intended that all matter contained in the above description or shown in the accompanying drawing shall be interpreted as illustrative only and not in a limiting sense.

Having thus described my invention what I claim as new and desire to secure by Letters Patent is:

1. In a device of the class described, the combination of a compressible air chamber, a reed pipe connected to be operated thereby and a flexible tube having an opening therethrough, through which opening the sound from the reed pipe is adapted to escape to the atmosphere, and means adapted to engage said flexible tube to restrict the opening therethrough and so control the sound from the reed pipe.

2. A device of the class described, comprising in combination, a resilient bulb provided with an aperture, a rigid disc closing said aperture, an extension mounted on said disc, and provided with a passageway therethrough, sound producing means mounted in said passageway, sound regulating means mounted in said passageway, and projecting exteriorly from the said extension, and a rod attached to the wall of said bulb and having means thereon adapted to actuate said sound regulating means by contact with the said projecting portion of the said means upon the collapse of said bulb.

3. A device of the class described, comprising in combination, a resilient bulb provided with an aperture, a rigid disc closing said aperture, an extension on said disc provided with a passageway therethrough, a reed mounted in said passageway in communication with the interior of said bulb, sound regulating means mounted in said passageway extending beyond the walls of said extension, and a rod mounted in the wall of said bulb and passing through said disc movably and adjacent to and outside the said extension, said rod being provided with means adapted to engage and actuate said sound regulating means outside the said extension upon the collapse of said bulb.

4. A device of the class described, comprising in combination, a resilient bulb provided with an aperture, a rigid disc closing said aperture, an extension mounted on said disc, a reed mounted in said extension in communication with the interior of said bulb, a resilient tube mounted on one end in said extension, in communication with said reed, the other end of said tube extending beyond the wall of said extension, and a rod attached at one end to the wall of said bulb, and being so formed at the other end as to engage said extended end of the resilient tube upon the collapse of said bulb, whereby to cause said tube to be successively closed and opened upon the collapse of said bulb.

5. A device of the class described, comprising in combination, a resilient bulb having an aperture, a rigid disc mounted in said aperture to form an air chamber with said bulb, an extension mounted on said disc, a reed mounted in said extension in communication with the interior of said bulb, and a resilient tube mounted at one end of said extension in communication with said reed, the other end of said resilient tube projecting beyond the walls of said extension, and a rod mounted at one end in the wall of said bulb, and being provided at its other end with a loop, said loop being so disposed as to engage said projecting end of the tube and to cause it to be closed a plurality of times, as said loop passes thereby upon the collapse of said bulb.

6. A device of the class described, comprising in combination, a collapsible air chamber, means operable by the air expelled therefrom upon its collapse to produce a sound, and means to vary the characteristics of said sound, said last named means including a resilient tube through which said sound is emitted, and means to bend said tube to shut off the flow of air therethrough.

7. A device of the class described, comprising in combination, a collapsible air chamber, means operable by the air expelled therefrom upon its collapse to produce a sound, and means to vary the characteristics of said sound, said last named means including a resilient tube through which said sound issues, and means to vary the cross-sectional area of said tube whereby to vary the sound.

8. In a device of the class described, the combination of a substantially spherical rubber bulb, means operable by the air expelled therefrom upon its collapse to produce sound and means for controlling said sound, said last mentioned means comprising a flexible tube through which the sound is adapted to issue, and means adapted to deform the tube to control the issuance of sound therethrough.

9. In a device of the class described, the combination of a collapsible air chamber, means operable by the air expelled therefrom upon its collapse to produce sound and means for controlling said sound, said last mentioned means comprising a flexible tube through which the sound is adapted to issue, and means, actuated upon the compression of said air chamber and acting to deform said tube to control the issuance of sound therethrough.

10. In a device of the class described, the combination of a collapsible air chamber, a sound device operatively connected therewith and operated thereby, and means for controlling the sound from said sound device, said last mentioned means comprising a member of flexible material having an opening therethrough, through which opening the sound is adapted to issue from the sound device, and means for causing said opening to be restricted by bringing the sides of the opening together to control the issuance of sound therethrough.

11. In a device of the class described, the combination of a collapsible air chamber, a sound device operatively connected therewith and operated thereby, and means for controlling the sound from said sound device, said last mentioned means comprising a member of flexible material having an opening therethrough, through which opening the sound is adapted to issue from the sound device, and means for causing said opening to be restricted by bringing the sides of the opening together to control the issuance of sound therethrough, said last mentioned means being operated by the operation of said air chamber.

12. In a device of the class described, the combination of a collapsible air chamber formed of a substantially spherical rubber bulb, a sound device operatively connected therewith and operated thereby, and means for controlling the sound from said sound device, said last mentioned means comprising a member of rubber having an opening therethrough, through which opening the sound is adapted to issue from the sound device, and means for causing said opening to be restricted by bringing the sides of the opening together to control the issuance of sound therethrough, said last mentioned means being operated by the operation of said air chamber.

In testimony whereof, I affix my signature.

FRED EVANS.